(12) United States Patent
Kaylor et al.

(10) Patent No.: US 7,015,797 B2
(45) Date of Patent: Mar. 21, 2006

(54) SYSTEM AND METHOD OF PROVIDING INFRA-RED SIGNALS OVER POWER LINES

(75) Inventors: Robert Kaylor, Rowlett, TX (US); Sealtiel Avalos, Dallas, TX (US); Robert F. Kessler, Dallas, TX (US); Randall Muncy, Wylie, TX (US)

(73) Assignee: Cable Electronics, Inc., Garland, TX (US)

( * ) Notice: Subject to any disclaimer, the term of this patent is extended or adjusted under 35 U.S.C. 154(b) by 48 days.

(21) Appl. No.: 10/775,805

(22) Filed: Feb. 10, 2004

(65) Prior Publication Data

US 2004/0161238 A1 Aug. 19, 2004

Related U.S. Application Data

(60) Provisional application No. 60/446,148, filed on Feb. 10, 2003.

(51) Int. Cl.
*H04M 11/04* (2006.01)

(52) U.S. Cl. .................. 340/310.11; 340/825.22; 340/825.57; 398/15

(58) Field of Classification Search .......... 340/310.01, 340/825.22, 825.57, 825.69; 398/115, 116
See application file for complete search history.

(56) References Cited

U.S. PATENT DOCUMENTS

| 4,959,810 | A | * | 9/1990 | Darbee et al. ......... 340/825.69 |
| 5,161,021 | A | * | 11/1992 | Tsai ...................... 340/825.69 |
| 5,818,127 | A | * | 10/1998 | Abraham ............... 340/310.07 |
| 6,441,723 | B1 | * | 8/2002 | Mansfield, Jr. et al. . 340/310.01 |
| 6,842,459 | B1 | * | 1/2005 | Binder ...................... 370/463 |

* cited by examiner

*Primary Examiner*—Thomas Mullen
(74) *Attorney, Agent, or Firm*—Haynes and Boone, LLP

(57) ABSTRACT

A method and system for transmitting infra-red (IR) signals through power lines. An IR signal may be received and substituted with a corresponding RF signal. The RF signal may be placed on a power line network in one location and removed by a high-pass filter at a second location. The RF signal may be converted back to the corresponding IR signal.

22 Claims, 3 Drawing Sheets

| | |
|---|---|
| 405 | RECEIVE A BIT STREAM AS AN IR SIGNAL |
| 410 | SUBSTITUTE A RF SIGNAL STREAM FOR THE RECEIVED BIT STREAM |
| 415 | FILTER AND AMPLIFY THE RF SIGNAL |
| 420 | PASS THE RF SIGNAL INTO A POWER LINE |
| 425 | RECOVER THE RF SIGNAL FROM THE POWER LINE |
| 430 | FILTER AND AMPLIFY THE RF SIGNAL |
| 435 | CONVERT THE RF SIGNAL TO A DIGITAL BIT STREAM |
| 440 | TRANSMIT AN IR SIGNAL THAT IS CONTROLLED BY THE DIGITAL BIT STREAM |

SYSTEM AND METHOD OF PROVIDING INFRA-RED SIGNALS OVER POWER LINES

CROSS REFERENCE

The present application claims priority from U.S. Provisional Patent Application Ser. No. 60/446,148, filed on Feb. 10, 2003, which is herein incorporated by reference.

DETAILED DESCRIPTION

Figure 1:
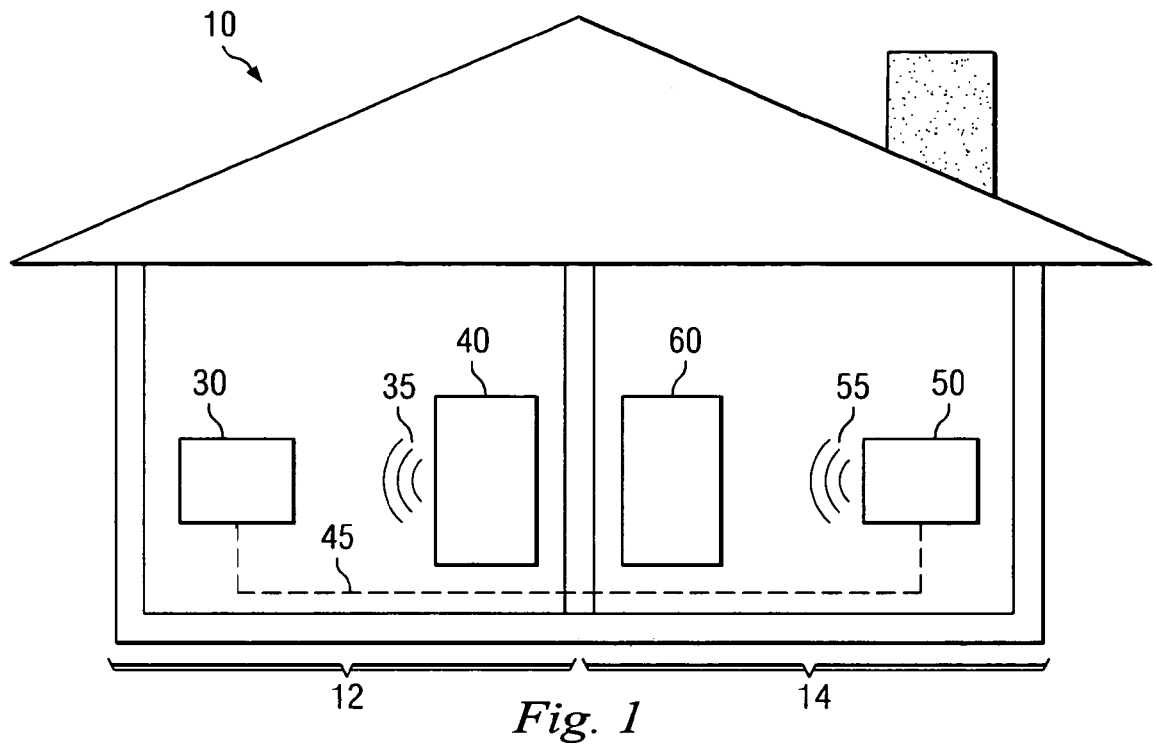
FIG. 1 is a diagram of an exemplary environment in which one embodiment of a power line infra-red (IR) receiver and transmitter may be implemented.

The present disclosure relates generally to signal and control systems and, more specifically, to a system and method for providing infra-red (IR) signals over power lines. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not, in itself, dictate a relationship between the various embodiments and/or configurations discussed.

Referring to FIG. 1, a diagram of one possible environment 10 for a power line infra-red transmitter 30 and receiver 50 is illustrated. The environment 10 may be a house or other building and may contain one or more rooms 12, 14. In room 12, for example, a powerline IR transmitter 30 may receive an IR signal 35 from an IR source device 40. As will be described in greater detail below, the IR transmitter 30 may convert the IR signal 35 into an RF signal and transmit it through a power line 45. The power line 45 may be a part of a standard AC wiring system of the house 10. The RF signal may be received by the IR receiver 50, which may convert the RF signal back into an IR signal 55 and transmit the signal to an IR receiving device 60.

Figure 2:
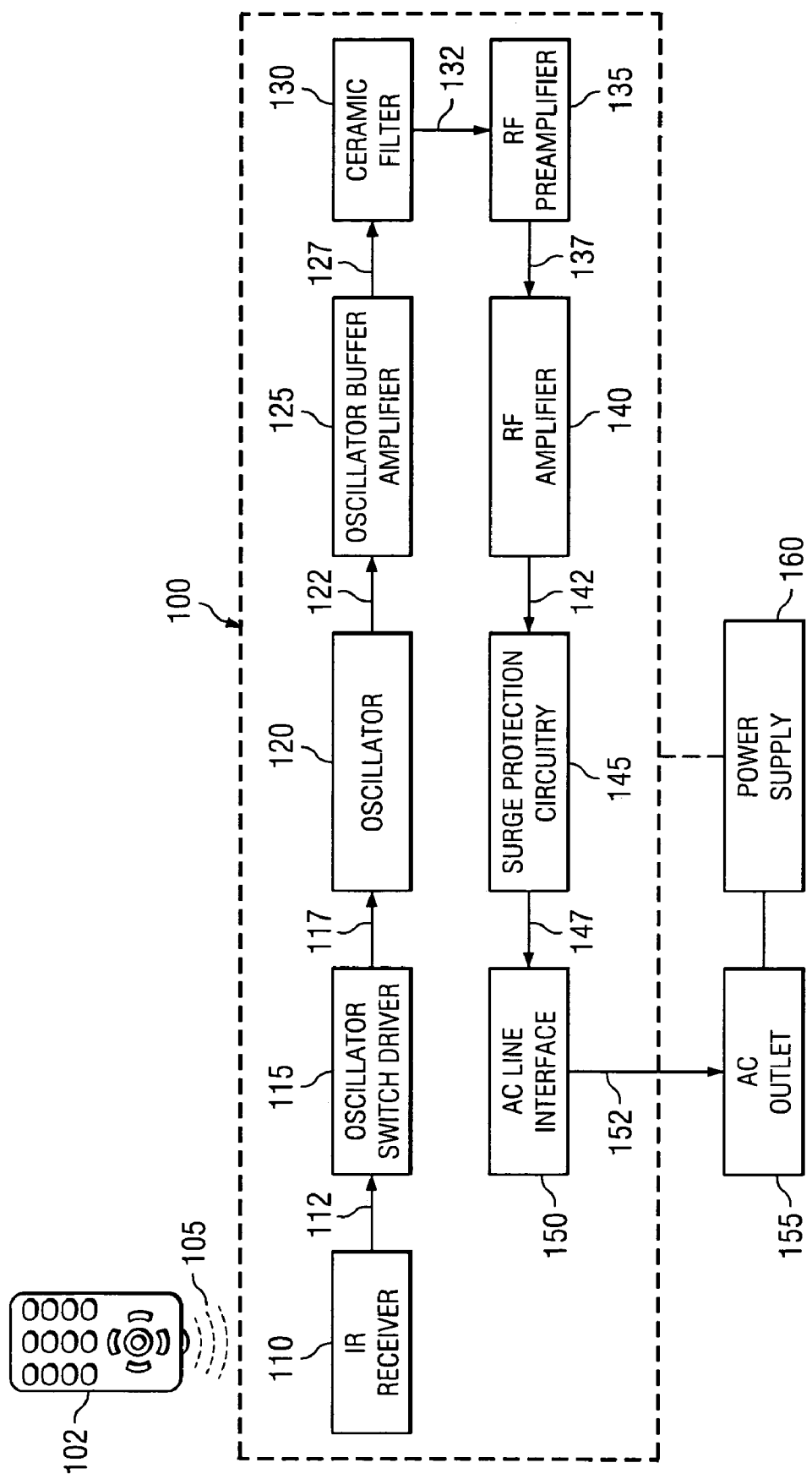
FIG. 2 is a block diagram of one embodiment of a power line infra-red transmitter.

Referring to FIG. 2, a block diagram of one embodiment of a power line infra-red (IR) transmitter 100 (such as the transmitter 30 of FIG. 1) is illustrated. A transmission source 102 may transmit an IR signal 105 to an IR receiver 110. The transmission source 102 and IR signal 105 may correspond to the transmission source 40 and IR signal 35 (both of FIG. 1), respectively. The IR receiver 110 may pass the IR signal 105 as a digital bit stream 112 to an oscillator switch driver 115. The switch driver 115 may pass a signal 117 to an oscillator 120, which may pass an RF signal 122 to an oscillator buffer amplifier 125. The oscillator buffer amplifier 125 may pass a signal 127 to a filter 130, which may pass a signal 132 to a radio frequency (RF) preamplifier 135 and an RF amplifier 140. Following a first stage of amplification, signal 137 may be passed from the RF preamplifier 135 to the RF amplifier 140. A signal 142 from RF amplifier 140 may pass to surge protection circuitry 145. A signal 147 from the surge protection circuitry 145 may pass to the AC line interface 150, which may place signal 152 into a power line system via an AC outlet 155. Also connected to the AC outlet 155 may be a power supply 160, which may provide power to the circuitry of the device 100.

The IR signal 105 may represent a signal (e.g., data, etc.) coming from the transmission source 102. The source 102 may be a remote control, a personal computer, a personal digital assistant, a printer, or some other device which may communicate via IR signals. In one embodiment, the source 102 is a remote control that encodes a digital bit stream corresponding to buttons on the remote, which may be pressed by a user. The bitstream may be transmitted as the infrared signal 105, which may turn on and off in response to the bitstream at a frequency ranging from about 38 kHz to about 40 kHz. In some embodiments, other bands of radiation such as laser, visible, or UV may be used to transmit the signal 105. Similarly, the frequency of the signal 105 may be out of the exemplary range given above.

The IR receiver 110 may receive the transmitted IR signal 105. The IR receiver 110 may be an integrated component of the device 100 or it may be located at the end of a cable extension (not shown) or another connector. The IR receiver 110 may be a commercially available model or it may be custom-designed. The IR receiver 110 may receive the signal 105 using an IR diode (not shown). The signal 105 may be amplified, limited, filtered, demodulated, integrated, shaped, or a combination thereof. The output signal 112 from the IR receiver 110 may be a digital bit stream corresponding the original IR signal 105. The signal 112 may be passed to the oscillator switch driver 115.

The oscillator switch driver 115 may be configured as a switch to control switching of the RF oscillator 120 based on the signal 112. The output signal 117 from the oscillator switch driver 115 may be an on-off signal for the RF oscillator 120. The RF oscillator 120 may be a transistor oscillator with a tank circuit, for example. In the present example, the RF oscillator 120 may be tuned to a frequency of operation in the range of about 4 MHz to about 12 MHz. A feedback mechanism (not shown) may also be employed to ensure correct oscillation. The RF oscillator output signal 122, which may be an RF signal containing RF pulses corresponding to the original IR signal 105, may be passed from the RF oscillator 120 to the oscillator buffer amplifier 125. In other embodiments, frequencies outside of the RF range may be employed by the RF oscillator 120 to generate output signals outside of the RF range.

The oscillator buffer amplifier 125 may be a transistor amplifier and may serve to provide an interface to the remaining circuit components. The oscillator buffer amplifier 125 may provide isolation from the next stage (e.g., the filter 130). For example, the oscillator buffer amplifier 125 may prevent loading of the oscillator 120 and may provide a low impedance driver to better match the impedance of the filter 130. The output signal 127 from the oscillator buffer amplifier 125 may be substantially the same as signal 122 and may be passed to the filter 130.

The filter 130 may be ceramic filter or another type of filter. The filter 130 may be a band-pass filter, for example, which may be substantially centered on the frequency of the RF oscillator 120. The filter 130 may be wide enough to pass the RF signal 127, while rejecting frequencies greater than about 150 kHz above or below the center frequency by about 30 dB. The output signal 132, which may be a cleaner version of signal 127, may be passed to the RF preamplifier 135 and RF amplifier 140.

The RF preamplifier 135 and RF amplifier 140 may be transistor amplifiers or other types of amplifiers. The RF preamplifier 135 and RF amplifier 140 may serve to raise the signal 132 to a level sufficient to be detected across an AC powerline. The signal 132 may first pass through the preamplifier 135 and then to the amplifier 140 as signal 137. The output signal 142 from the RF amplifier 140, which may represent an amplified version of signal 132, may be passed to the surge protection circuitry 145.

The surge protection circuitry 145 may contain one or more of a diode limiter, a resistive attenuator, and/or a transient absorber. The surge protection circuitry 145 may operate to minimize or eliminate the possibility of a power surge coming back from the AC outlet 155 and damaging the device 100. The output signal 147, which may be substantially similar to signal 142, may be passed to the AC line interface 150.

The AC line interface 150 may contain an isolation balun transformer and a resistive and capacitive circuit network. The AC line interface 150 may also act as a filter which passes the relatively high frequency RF signal 147 to the AC outlet 155 as signal 152. The AC line interface 150 may also reject the relatively low frequency AC voltage (e.g., 115 VAC 50/60 CYCLES) from the powerline system to prevent it from being passed back into the device 100.

The signal 152, after passing into the AC outlet 155, may be present on a powerline system (not shown) such as that within a house or other building (e.g., FIG. 1). The signal 152 may be available at one or more AC outlets or other contact points which may be on the same powerline system as AC outlet 155. The signal 152 may be picked up, or read, from another AC outlet on the powerline system. The AC outlet 155 may be a standard US outlet, a European outlet, or some other type of AC outlet. The AC outlet 155 may also supply the voltage necessary (e.g., 115 VAC) to power the circuitry of the device 100. The 115 VAC may first be converted to a DC voltage by the power supply 160. The power supply 160 may contain a power transformer, rectifier diodes, filter capacitors, a voltage regulator, and/or other components needed to convert the power to a useful level by the device 100.

Figure 3:
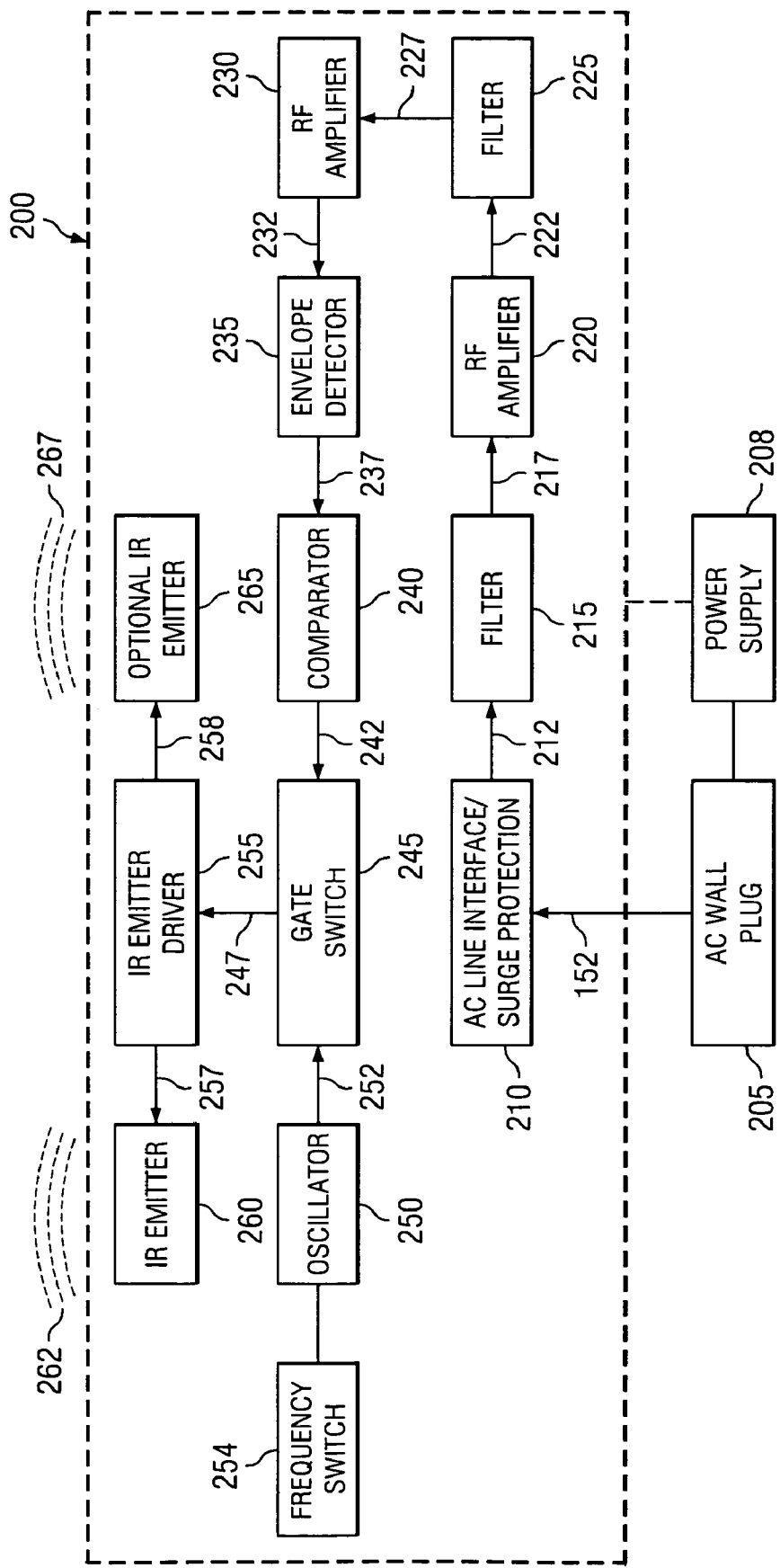
FIG. 3 is a block diagram of one embodiment of a power line IR receiver.

Referring now to FIG. 3, a block diagram of a power line IR receiver 200 (e.g., receiver 50 of FIG. 1) is illustrated. AC outlet 205 may provide a power source (e.g., 115 VAC) to power supply 208, which may power the circuitry of the device 200. The AC outlet 205 may be located on the same power line network as AC outlet 155 (FIG. 3). Thus the AC outlet 205 may provide the RF signal 152 to a combination AC line interface and surge protector 210. A signal 212 may pass from the AC line interface 210 to a first filter 215. The filter 215 may pass a signal 217 to an amplifier 220, which may pass a signal 222 to a second filter 225. The second filter 225 may pass a signal 227 to a second amplifier 230, which may provide a signal 232 to an envelope detector 235. The envelope detector 235 may provide a signal 237 to a comparator 240, which may provide a signal 242 to a gate switch 245. Based on a frequency switch 254, an oscillator 250 may also be feeding a signal 252 into the gate switch 245. The gate switch 245 may output a signal 247 to an IR emitter driver 255, which may provide a signal 257, 258 to IR emitters 260, 265 respectively. IR emitters 260, 265 may provide IR signals 262, 267 respectively. IR signals 262, 267 may correspond to IR signal 55 (FIG. 1).

The AC outlet 205 may serve as a power source as well as providing the RF signal 152. The power provided by the AC outlet 205, which may be 115 VAC or some other voltage, may be converted to a DC voltage by the power supply 208. The power supply 208 may contain one or more of a power transformer, rectifier diodes, filter capacitors, and/or a voltage regulator. The power supply 208 may provide operating power to the circuitry of the device 200.

The signal 152 may be received by the AC line interface 210 and may be superimposed on, or imbedded in, the power signal (e.g., 115 VAC). The AC line interface 210 may contain surge protection circuitry, which may include a transient absorber, attenuator, diode limiter, and/or other components. The surge protection circuitry may protect the device 200 from harmful spikes and surges in the AC power line. The AC line interface 210 may also contain an isolation balun transformer and a resistive and capacitive circuit network. The AC line interface 210 may act as a high-pass filter and block the 115 VAC while passing the RF signal 152. The AC line interface 210 may pass the signal 212 to the first filter 215. Signal 212 may be an RF signal, which may be substantially similar to signal 152, (e.g., minus the 115 VAC).

The first filter 215 may be a ceramic filter or another type of filter. The first filter may be a band-pass filter, which may be pre-set to the center of the information channel (e.g., the center frequency of signal 212). The first filter 215 may block, by about 30 dB, unwanted signals surrounding the information channel by about plus or minus 150 kHz. This may prevent overloading of the first RF amplifier 220 by reducing noise in the signal 212. The filtered RF output signal 217 may be passed to the first RF amplifier 220. The first RF amplifier 220 may be a single-stage transistor amplifier, for example. The amplified signal 222 may be passed to a second filter 225, which may filter out noise not filtered by the first filter 215 and which may appear amplified in signal 222. The second filter 225 may be a ceramic band-pass filter, for example. The second filtered signal 227 may be passed to a second RF amplifier 230 that may be a single stage transistor amplifier that may serve to provide the output signal 232 at an amplitude sufficient for further processing. In some embodiments, the filtering and amplification process taking place in the filters 215, 225 and the amplifiers 220, 230, respectively, may involve more or fewer amplifiers and filters than shown here.

The second amplified signal 232 may be passed to the envelope detector 235. The envelope detector 235 may contain one or more diodes and/or other resistive and capacitive circuitry. The envelope detector 235 may be configured to amplitude demodulate the signal 232 and provide an output signal 237 that is an analog representation of the RF carrier pulses in signal 232. The analog output 237 may be sent to the comparator 240.

The comparator 240 may be configured to compare the signal 237 to an internal reference voltage, which may be the average voltage of the signal 237, for example. The output 242 may be switched to a high or low state depending on the result of the comparison of the incoming signal 237 versus the reference voltage. Thus, the output 242 of the comparator 240 may be a bitstream corresponding to the original bitstream of the source 102 (FIG. 2). The output 242 may be fed into the gate switch 245. The gate switch 245 may be a logic gate that has the oscillator output 252 on one input and the output 242 of the comparator 240 on another input. The gate switch 245 may be configured to switch on and off depending on the output 242 of the comparator 240 and thus has an output 247 that corresponds to the bit stream of the source 102. In an on state, the gate switch 245 may pass the output 252 of oscillator 250 to the gate switch output 247.

The oscillator 250 may contain two logic gates with an RC feedback network to support oscillation at a desired frequency. A resistor (not shown) within the oscillator 250 may be variable so that the oscillation frequency may be changed or adjusted. The oscillator 250 may also employ a frequency switch 254, which may vary a resistance in the oscillator 250 in order to select different frequencies for the output 252. In one embodiment, the frequency of the output 252 may range from about 38 kHz to about 40 kHz. Thus, the output 247 of the gate switch 245 may be pulses of the oscillator 250 frequency, which are output at the comparator 240 bit stream rate.

The output 247 of the gate switch 245 may be passed to the IR emitter driver 255. The IR emitter driver 255 may serve as a voltage to current converter. The IR emitter driver 255 may contain a single transistor stage, which accepts the pulsed 38 to 40 kHz carrier and sends a corresponding current 257 which may drive IR emitter 260. Some embodiments will have additional outputs (e.g., 258) and IR emitters (e.g., 265). The IR Emitters 260, 265 may be IR diodes, for example. The output 262, 267 of the IR emitters 260, 265 may duplicate the original signal 105 that was produced by the IR source 102.

Figure 4:
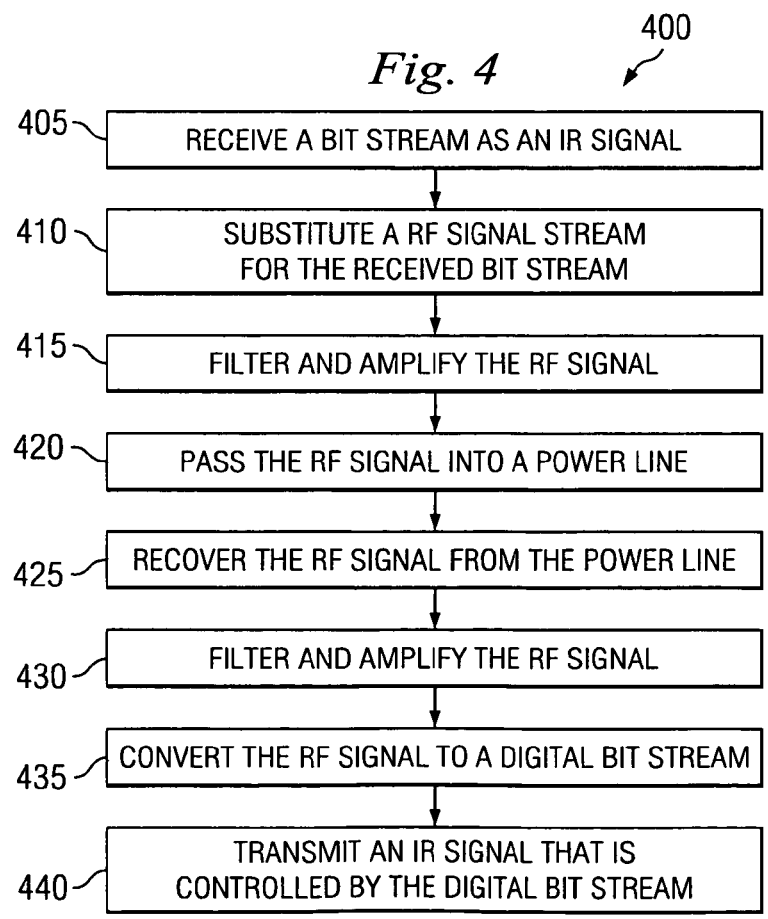
FIG. 4 is a flow chart of an exemplary method for providing IR signals over power lines.

Referring to FIG. 4, an exemplary method 400 illustrates one process by which a signal, such as an IR signal, may be converted into a different signal type, transmitted over a power line, recovered from the power line, and returned to an IR signal. The method 400 begins in step 405 by receiving a bit stream as an IR signal. It is understood that the signal need not be a bit stream, but may be other signal types (e.g., non-binary). In step 410, an RF signal stream may be substituted for the received bit stream and, in step 415, the RF signal may be filtered and amplified as previously described. In steps 420, 425, the RF signal may be transmitted via a power line and recovered. For example, the RF signal may be transmitted via an AC wall socket from one room to another room. It is understood that, while the RF signal may be recovered in a neighboring room, the signal may actually be available through the house or building serviced by the power line. In this manner, the RF signal may be recovered in any room that has an outlet or other access means to the power line. In step 430, the recovered RF signal may be filtered and amplified. In step 435, the RF signal may be converted to a digital bit stream that may be used to control an IR emitter in step 440. Accordingly, the original IR signal may be recreated from the RF signal transferred via the power line.

While the disclosure has been shown and described with reference to particular embodiments thereof, it will be understood by those skilled in the art that various changes in form and detail may be made without departing from the scope and spirit of the disclosure. For example, some of the components described herein may be combined or may appear in a different order than shown. Furthermore, it is understood that the various components may be implemented in different ways to achieve the same result. In addition, it is understood that, while the present disclosure refers to signals passing between components by different reference numbers, this done is for the purpose of illustration. For example, the data or other information represented by a signal may be maintained throughout the transmission and receiving process, but may be manipulated in the manner described. Also, although portions of the disclosure are described using bit streams, it is understood that other signals may be used that are not binary. It is understood that several modifications, changes, or substitutions are intended in the foregoing disclosure and in some instances, some features of the disclosure may be employed without a corresponding use of other features. Accordingly, it is appropriate that the following claims be construed broadly and in a manner consistent with the scope of the disclosure.

What is claimed is:

1. A method of transmitting an infra-red (IR) signal through a power line, the method comprising:
   receiving a bit stream as an IR signal;
   substituting an RF signal bit stream for the received bit stream;
   filtering and amplifying the RF signal; and
   passing the RF signal into a power line, wherein passing the RF signal comprises passing the RF signal through a high-pass filter connected to the power line, wherein the power line operates at about 60 Hz.

2. A method of transmitting an infra-red (IR) signal through a power line, the method comprising:
   receiving a bit stream as an IR signal;
   substituting an RF signal bit stream for the received bit stream, wherein substituting comprises converting the IR signal to a digital bit stream; and selectively generating an oscillating RF signal in response to the digital bit stream;
   filtering and amplifying the RF signal; and
   passing the RF signal into a power line.

3. The method of claim 2 wherein the RF signal oscillates at a frequency ranging from about 4 Mhz to about 12 Mhz.

4. A method of transmitting an infra-red (IR) signal through a power line, the method comprising:
   receiving a bit stream as an IR signal;
   substituting an RF signal bit stream for the received bit stream;
   filtering and amplifying the RF signal, wherein filtering and amplifying comprise passing the RF signal through a band-pass filter; and passing the RF signal through a two-stage RF amplifier; and
   passing the RF signal into a power line.

5. The method of claim 4 wherein the band-pass filter is a ceramic filter.

6. The method of claim 4 wherein the two-stage RF amplifier comprises:
   a transistor-based preamplification stage; and
   a transistor-based amplification stage.

7. A method of receiving an infra-red (IR) signal from a power line, the method comprising:
   receiving an RF signal representing an IR bitstream from an AC line transmission path, wherein receiving the RF signal includes rejecting signals on the AC line transmission path with a frequency corresponding to an AC voltage on the AC line transmission path;
   filtering and amplifying the RF signal;
   converting the RF signal to a digital bit stream; and
   transmitting an IR signal that is controlled by the digital bit stream.

8. A method of receiving an infra-red (IR) signal from a power line, the method comprising:
   receiving an RF signal representing an IR bitstream from an AC line transmission path;
   filtering and amplifying the RF signal, wherein filtering and amplifying comprises passing the RF signal through a series of ceramic band-pass filters; and passing the RF signal through a series of transistor-based RF amplifiers;
   converting the RF signal to a digital bit stream; and
   transmitting an IR signal that is controlled by the digital bit stream.

9. A method of receiving an infra-red (IR) signal from a power line, the method comprising:
   receiving an RF signal representing an IR bitstream from an AC line transmission path;
   filtering and amplifying the RF signal;
   converting the RF signal to a digital bit stream, wherein converting comprises demodulating the RF signal into an analog bitstream signal; and passing the analog bit stream signal into a comparator to produce the digital; and
   transmitting an IR signal that is controlled by the digital bit stream.

10. A method of receiving an infra-red (IR) signal from a power line, the method comprising:
    receiving an RF signal representing an IR bitstream from an AC line transmission path;
    filtering and amplifying the RF signal;
    converting the RF signal to a digital bit stream; and transmitting an IR signal that is controlled by the digital bit stream, wherein transmitting comprises selectively switching an oscillator on and off with a gate switch controlled by the digital bit stream; sending an output from the oscillator to an IR emitter driver; and selectively emitting the IR signal from an IR emitter based on an output from the IR emitter driver.

11. The method of claim 10 wherein the oscillator operates at a frequency ranging from about 38 kHz to about 40 kHz.

12. The method of claim 10 wherein the IR emitter comprises an IR diode.

13. A system for transmitting and receiving an infra-red (IR) signal over a power line, the system comprising:
a IR receiver configured to receive a first IR bit stream and convert the first IR bit stream to a pulsed RF analog signal;
a first AC line interface for placing the RF analog signal on an active power line, wherein the first AC line interface comprises a high-pass filter configured to pass the pulsed RF analog signal into the active power line;
surge protection circuitry coupled to the first AC line interface;
a second AC line interface for extracting the RF analog signal from the active power line;
circuitry for converting the RF analog signal to an RF digital bit stream; and
an IR emitter configured to transmit the RF digital bit stream as a second IR bit stream.

14. A system for transmitting and receiving an infra-red (IR) signal over a power line, the system comprising:
a IR receiver configured to receive a first IR bit stream and convert the first IR bit stream to a pulsed RF analog signal, wherein the IR receiver comprises an IR diode configured to receive the first IR bit stream; an oscillator switch driver configured to provide an oscillator control signal in response to the first IR bit stream; and an oscillator configured to produce the pulsed RF analog signal in response to the oscillator control signal;
a first AC line interface for placing the RF analog signal on an active power line;
a second AC line interface for extracting the RF analog signal from the active power line;
circuitry for converting the RF analog signal to an RF digital bit stream; and
an IR emitter configured to transmit the RF digital bit stream as a second IR bit stream.

15. The system of claim 14 wherein the oscillator operates at a frequency ranging from about 4 MHz to 12 MHz.

16. A system for transmitting and receiving an infra-red (IR) signal over a power line, the system comprising:
a IR receiver configured to receive a first IR bit stream and convert the first IR bit stream to a pulsed RF analog signal;
a first AC line interface for placing the RF analog signal on an active power line;
a second AC line interface for extracting the RF analog signal from the active power line, wherein the second AC line interface comprises a high-pass filter configured to separate the pulsed RF analog signal out of the active power line; and surge protection circuitry;
circuitry for converting the RF analog signal to an RF digital bit stream; and
an IR emitter configured to transmit the RF digital bit stream as a second IR bit stream.

17. A system for transmitting and receiving an infra-red (IR) signal over a power line, the system comprising:
a IR receiver configured to receive a first IR bit stream and convert the first IR bit stream to a pulsed RF analog signal;
a first AC line interface for placing the RF analog signal on an active power line;
a second AC line interface for extracting the RF analog signal from the active power line;
circuitry for converting the RF analog signal to an RF digital bit stream, wherein the circuitry for converting the pulsed analog RF signal comprises a band-pass ceramic filter configured to pass the pulsed RF signal; an RF amplifier configured to amplify the filtered pulsed RF signal; an envelope detector for demodulating the amplified pulsed RF signal into an analog bit stream; and a comparator configured to produce the RF digital bit stream corresponding to the analog bit stream; and
an IR emitter configured to transmit the RF digital bit stream as a second IR bit stream.

18. A system for transmitting and receiving IR signals over a power line, the system comprising:
an IR receiver configured to receive a first IR bit stream and convert the first IR bit stream to a first analog bit stream signal;
a first, switched oscillator configured to produce a pulsed RF signal in response to the first analog bit stream signal;
a first AC line interface configured to place the pulsed RF signal onto a power line network at a first location;
a second AC line interface for reading the pulsed RF signal from the power line network at a second location;
an envelope detector configured to provide a demodulated analog signal in response to the pulsed RF signal read by the second AC line interface;
a comparator configured to provide a switching signal in response to the demodulated analog signal;
a second oscillator configured to selectively provide an RF voltage in response to the switching signal; and
an IR emitter configured to emit a second IR signal in response to the RF voltage.

19. The system of claim 18 further comprising:
a ceramic band-pass filter following the switched oscillator and configured to pass the pulsed RF signal; and
a two-stage transistor-based amplifier following the ceramic filter and configured to amplify the pulsed RF signal.

20. The system of claim 18 wherein the first oscillator operates at a frequency ranging from about 4 MHz to about 12 MHz.

21. The system of claim 18 wherein the frequency of the second oscillator is changeable.

22. The system of claim 18 wherein the IR emitter comprises a voltage to current converter.

* * * * *